US010814445B2

(12) United States Patent
Roberge

(10) Patent No.: US 10,814,445 B2
(45) Date of Patent: Oct. 27, 2020

(54) AIRFOIL MACHINING

(71) Applicant: United Technologies Corporation, Farmington, CT (US)

(72) Inventor: Gary D. Roberge, Tolland, CT (US)

(73) Assignee: Raytheon Technologies Corporation, Farmington, CT (US)

(*) Notice: Subject to any disclaimer, the term of this patent is extended or adjusted under 35 U.S.C. 154(b) by 877 days.

(21) Appl. No.: 15/149,543

(22) Filed: May 9, 2016

(65) Prior Publication Data

US 2017/0320178 A1 Nov. 9, 2017

(51) Int. Cl.
B23Q 3/08 (2006.01)
B23Q 3/06 (2006.01)
B23Q 11/12 (2006.01)
B23Q 17/22 (2006.01)
F01D 5/14 (2006.01)
(Continued)

(52) U.S. Cl.
CPC ............ B23Q 3/086 (2013.01); B23Q 3/063 (2013.01); B23Q 11/126 (2013.01); B23Q 17/2233 (2013.01); F01D 5/147 (2013.01); F01D 5/30 (2013.01); F04D 29/322 (2013.01); F04D 29/324 (2013.01); F04D 29/34 (2013.01); F04D 29/38 (2013.01); F05D 2220/32 (2013.01);
(Continued)

(58) Field of Classification Search
CPC . B23C 2215/44; B23C 2215/04; F01D 25/28; F01D 25/285; F05D 2230/10; B23Q 3/086; B23Q 3/063; B23Q 3/06; B23Q 17/2233
See application file for complete search history.

(56) References Cited

U.S. PATENT DOCUMENTS 2,641,879 A 6/1953 Dalrymple
2,722,867 A 11/1955 Dackor
(Continued)

FOREIGN PATENT DOCUMENTS

CN 103350213 10/2013
EP 2123394 11/2009

OTHER PUBLICATIONS

Machine Translation of EP2123394A1 by Bernard Schmitt. "Device for holding an ingot for making cuts". (Year: 2009).*

(Continued)

Primary Examiner — David P Bryant
Assistant Examiner — Nirvana Deonauth
(74) Attorney, Agent, or Firm — Getz Balich LLC

(57) ABSTRACT

Disclosed is a method for machining a component, comprising: installing the component on a fixture, causing a medium of the fixture to solidify to encase a first portion of the component, applying a toolset to a second portion of the component that is outside of the solidified medium, and subsequent to applying the toolset, extracting the component from the fixture when the medium is in one of a liquid state or a semi-liquid state, where the medium has a melting-point temperature that is less than 500 degrees Fahrenheit. Disclosed is a fixture for machining a component, comprising: a medium configured to encase a first portion of the component when the medium is in a solidified state, and a toolset configured to be applied to a second portion of the component that is outside of the solidified medium, the medium having a melting-point temperature that is less than 500 degrees Fahrenheit.

8 Claims, 4 Drawing Sheets

(51) Int. Cl.
*F01D 5/30* (2006.01)
*F04D 29/32* (2006.01)
*F04D 29/34* (2006.01)
*F04D 29/38* (2006.01)

(52) U.S. Cl.
CPC ...... *F05D 2230/10* (2013.01); *F05D 2230/30* (2013.01)

(56) References Cited

U.S. PATENT DOCUMENTS

| | | | |
|---|---|---|---|
| 2,855,664 | A | 10/1958 | Griffith |
| 4,132,689 | A | 1/1979 | Speyer |
| 4,289,191 | A | 9/1981 | Myllymaki |
| 4,822,013 | A | 4/1989 | Johnson |
| 4,873,751 | A | 10/1989 | Walker |
| 5,013,014 | A * | 5/1991 | Mushardt ............... B23Q 3/063 269/7 |
| 5,313,743 | A | 5/1994 | Peschik |
| 6,329,633 | B1 | 12/2001 | Lamm |
| 6,454,636 | B1 | 9/2002 | Iwabuchi |
| 7,219,408 | B2 | 5/2007 | Jones |
| 2002/0148589 | A1 | 10/2002 | Mertins |
| 2004/0111866 | A1 * | 6/2004 | Kao ............... B23Q 3/086 29/558 |
| 2006/0168808 | A1 * | 8/2006 | Lin ............... B23K 9/044 29/889.1 |
| 2009/0220349 | A1 * | 9/2009 | Bolms ............... F01D 5/005 416/97 R |
| 2010/0293786 | A1 | 11/2010 | Powers |
| 2016/0265361 | A1 * | 9/2016 | Moss ............... B23H 7/26 |
| 2016/0339551 | A1 * | 11/2016 | Morihara ............... B23Q 1/035 |
| 2018/0056396 | A1 * | 3/2018 | Menon ............... F01D 5/12 |

OTHER PUBLICATIONS

Partial EP Search Report for EP Patent Appln. No. 17170230.1 dated Oct. 6, 2017.
ibagnorthamerica.com, "ICE-VICE Freeze Clamp Technology", Vacuum Clamping Systems, WITTE, pp. 50-57, available from: <http://www.ibagnorthamerica.com/pdfs/Freeze_Chuck_PDF.pdf> at least as of Mar. 16, 2016.
Wlodzimierz Wilk, "Modern Technology of the Turbine Blades Removal Machining", 8 International Conference Advanced Manufacturing Operations, pp. 347-355, available from: <http://amo.dmt-product.com/amo-08/pdfamo08/56.pdf> at least as of Mar. 16, 2016.
Elmer C. Lee, "Development of an Encapsulation Process for use in a Universal Automated Fixturing System", Massachusetts Institute of Technology, Thesis in support of Master of Science in Mechanical Engineering, Jun. 1999.

* cited by examiner

AIRFOIL MACHINING

BACKGROUND

As part of an initial or maintenance-related manufacturing procedure associated with an engine, one or more components of the engine may be machined. For example, a blade of the engine may be placed in a fixture and a portion of the blade (e.g., a root, an attachment, a platform, etc.) may be machined.

The fixture is typically made of a metal alloy that has a melting-point temperature that is less than a second melting-point temperature associated with the component (e.g., the blade). In terms of the machining procedure, the component is inserted in the fixture and then the metal alloy is allowed to cool to a temperature that is less than the melting-point temperature of the metal alloy such that the metal alloy solidifies and holds the component in place. Next, the technician/operator performs the machining operation on the component. Once the machining operation is complete, the fixture is heated to a temperature that is greater than the melting-point temperature of the metal alloy in order to free/release the component from the fixture. The fixture or the component may then be subject to cleaning to remove any excess material that may be present.

The use of the fixture described above presents a number of challenges. It takes a considerable amount of time to apply and remove the metal alloy from the component. The metal alloy material is costly and at least some of it ends up being wasted/expended on the component; for example, some of the material may end up needing to be cleaned from the component. The use of the metal alloy, which may include lead or bismuth, may impose additional cost in terms of environmental constraints that may need to be adhered to for safe handling/operation. Accordingly, what is needed is a more cost-efficient and environmentally friendly fixture for machining engine components.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a method for machining a component, comprising: installing the component on a fixture, causing a medium of the fixture to solidify to encase a first portion of the component, applying a toolset to a second portion of the component that is outside of the solidified medium, and subsequent to applying the toolset, extracting the component from the fixture when the medium is in one of a liquid state or a semi-liquid state, where the medium has a melting-point temperature that is less than 500 degrees Fahrenheit. In some embodiments, the medium includes water. In some embodiments, the medium includes an injection molded material. In some embodiments, the injection molded material includes at least one of a thermoplastic, a resin, or a wax. In some embodiments, the component is a blade. In some embodiments, the first portion of the blade includes an airfoil. In some embodiments, the second portion of the blade includes at least one of a root, an attachment, or a platform. In some embodiments, the method further comprises fixing an orientation of the component in the fixture prior to applying the toolset to the component. In some embodiments, the method further comprises determining an orientation of the component in the fixture prior to applying the toolset to the component, and adapting an operation of the toolset in accordance with the determined orientation. In some embodiments, the method further comprises applying a thermal mitigation technique to at least one of the medium or the second portion of the component when the toolset is applied to the second portion of the component. In some embodiments, the method further comprises applying heat to the medium to cause the medium to transition to the one of a liquid state or a semi-liquid state.

Aspects of the disclosure are directed to a fixture for machining a component, comprising: a medium configured to encase a first portion of the component when the medium is in a solidified state, and a toolset configured to be applied to a second portion of the component that is outside of the solidified medium, where the medium has a melting-point temperature that is less than 500 degrees Fahrenheit. In some embodiments, the fixture further comprises gage pins configured to fix an orientation of the component. In some embodiments, the fixture further comprises a scanning device configured to scan the component and generate data that pertains to an orientation of the component in the fixture, and a control computer configured to process the data to determine the orientation and control the toolset in accordance with the determined orientation. In some embodiments, the scanning device is operative on the basis of white light or the use of a laser. In some embodiments, the fixture further comprises a cooling source configured to cool the medium when the toolset is applied to the second portion of the component. In some embodiments, the cooling source includes a source of liquid nitrogen. In some embodiments, the fixture further comprises a control computer, and a temperature sensor, where the cooling source is controlled by the control computer based on an output of the temperature sensor. In some embodiments, the fixture further comprises a heat sink coupled to the second portion. In some embodiments, the fixture further comprises a control computer, a temperature sensor, and a thermal pad with resistive heaters that are controlled by the control computer based on an output of the temperature sensor that cause the medium to transition from the solidified state to at least one of a liquid state or a semi-liquid state.

BRIEF DESCRIPTION OF THE DRAWINGS

The present disclosure is illustrated by way of example and not limited in the accompanying figures in which like reference numerals indicate similar elements. The drawings are not necessarily drawn to scale unless specifically indicated otherwise.

DETAILED DESCRIPTION

Figure 1:
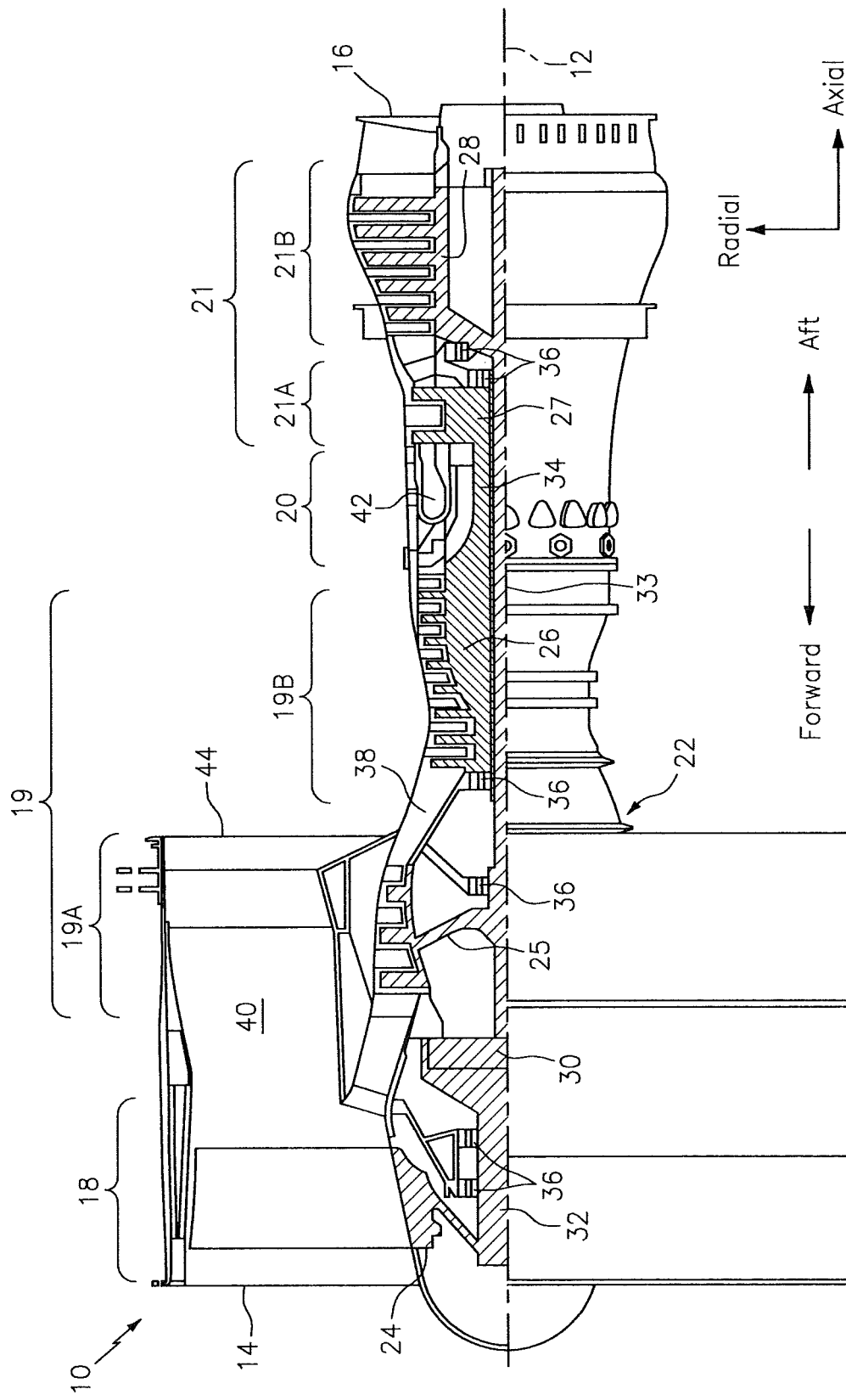
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with aspects of the disclosure, apparatuses, systems, and methods are directed to a fixture for machining a component. The component may be incorporated as part of an engine. In some embodiments, the component may include a blade (e.g., a fan blade, a compressor blade, a turbine blade, etc.). The fixture may include a medium that may undergo a phase change for fixing/securing the component prior to a machining operation and releasing the component following the machining operation. In some embodiments, the medium may include water or an injection molded material.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 2:
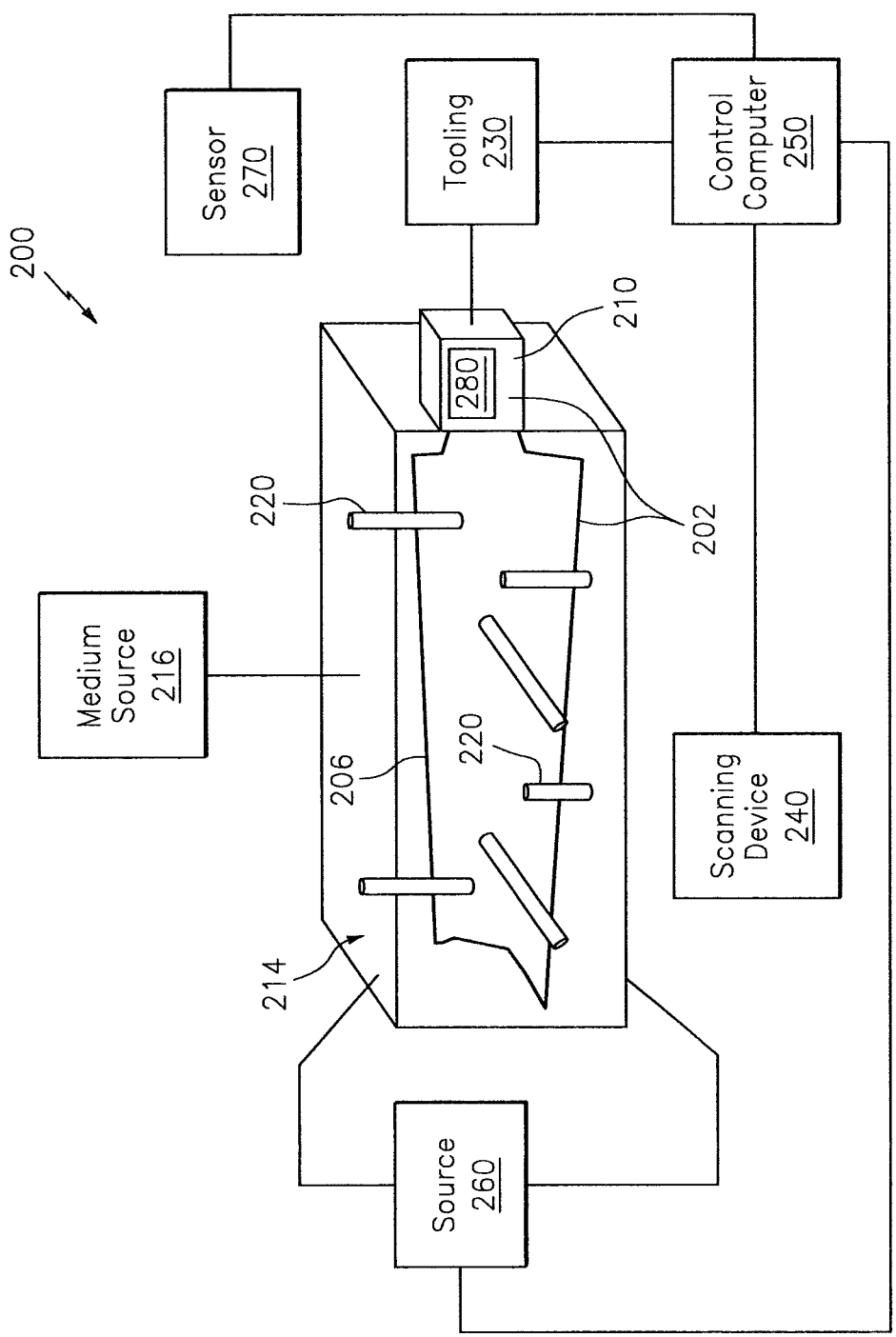
FIG. 2 illustrates a system that includes a component incorporated as part of a fixture in accordance with aspects of the disclosure.

Referring to FIG. 2, a system environment 200 is shown. At least a portion of the system 200 may be associated with a fixture as described below.

The system 200 is shown as including a blade 202 having an airfoil 206. In some applications, the blade 202 may be produced via a casting process. At least a portion of the blade 202, denoted by reference character 210, may be subject to machining. Examples include where the blade 202 is cast, with the airfoil 206 portion of the blade 202 formed with predefined geometric characteristics but other portions of the blade 202 require more precise dimensional characteristics and surface finish than a coating process can efficiently generate. In such embodiments, the portion 210 may correspond to a root, an attachment, or a platform of the blade 202 used to precisely position the blade 202 relative to adjacent components.

The blade 202 may be located within a medium 214 of a fixture. In some embodiments, the medium 214 may include water that may have an associated melting-point temperature of approximately 32 degrees Fahrenheit (approximately 0 degrees Celsius). In some embodiments, the medium 214 may include an injection molded material, such as for example a thermoplastic, a resin, a wax, etc. In some embodiments, the medium 214 may include nylon or other polymer materials. The injection molded material may have a melting-point temperature within one or more temperatures ranges, such as for example a range of 200 degrees Fahrenheit (approximately 93 degrees Celsius) and 500 degrees Fahrenheit (approximately 260 degrees Celsius). The use of an injection molded material for the medium 214 may allow the medium to tolerate higher loads than if water alone is used as the injection molded material may impart greater strength. Conversely, material removal machining techniques, including super abrasive machining, may be selected in order to minimize the induced loading on the fixture airfoil in an effort to more closely match the capability of the fixture. The medium 214 may be applied using one or more sources, such as for example the medium source 216.

The fixture may include one or more gage pins 220. The pins 220 may be used to create a reference datum for locating the blade 202 within the fixture (e.g., the medium 214). The pins 220 may provide information regarding the orientation of the blade 202 in one or more spatial dimensions. The pins 220 may assist in providing a predetermined orientation to the blade 202 such that a toolset 230 associated with the machining operation may be fixed. Stated slightly differently, the pins 220 may ensure a particular orientation of the blade 202 in the fixture, such that the machining operation performed using the toolset 230 may be repeated for each instance of a blade 202 installed on the fixture.

In some embodiments, a scanning device 240 may be configured to scan the blade 202 when the blade 202 is installed on the fixture. The scanning device 240 may be operative on the basis of white light or the use of a laser. The scanning device 240 may respond to commands issued by a control computer 250 to scan the blade 202. Data acquired by the scanning device 240 (where the data may be based on absorption, reflection, diffraction, or other characteristics) may be provided to the control computer 250. The control computer 250 may process the data to determine an orientation of the blade 202 in the fixture. This determined orientation may be used by the control computer 250 to establish a set of control parameters that may be used to control the toolset 230. For example, the control computer 250 may establish the control parameters and control the toolset 230 in accordance therewith. Thus, the use of the scanning device 240 and/or the control computer 250 may represent an alternative to the use of pins 220. The use of the scanning device 240 and the control computer 250 may allow for an adaptation of the toolset 230 based on variations in the orientation of the blade 202 within the fixture.

As the toolset 230 is applied as part of the machining operation, the portion 210 of the blade 202 that is subject to the machining may tend to get hot based on imparted frictional loads form the machining process. In order to maintain the medium 214 in a sufficiently solidified state, one or more sources 260 may be enabled/activated as part of a loop formed with, e.g., the medium 214, to cool the medium 214. In some embodiments, the source 260 may include liquid nitrogen. The source 260 (or associated loop) may be enabled or disabled by the control computer 250. The determination of whether to enable or disable the source 260 may be based on the output of one or more sensors 270 coupled to the control computer 250. The sensors 270 may include one or more temperature sensors. The sensors 270 may be in contact with the blade 202 encased in the medium 214 to monitor heat transfer during machining.

In some embodiments, a coolant collar/heat sink 280 may be applied to the portion 210 in proximity to the interface between the portion 210 and the toolset 230. The heat sink 280 may deter or prevent a conductive heat transfer into the medium 214.

Once the machining operation is complete, any cooling that may have been provided by the source 260 or the heat sink 280 may be removed/disabled. If the melting-point of the medium 214 is less than, e.g., room temperature the medium may be allowed to sit/rest until the melting-point temperature is reached at which point the blade 202 may be extracted/removed from the fixture. Alternatively, if the melting-point temperature of the medium 214 is greater than room temperature or if there is a desire to accelerate the extraction of the blade 202 from the fixture, a source of heat may be applied to the medium 214. The source of heat may correspond to the source 260 (e.g., the same source 260 may be used to cool or heat the medium 214) or a separate, dedicated source. The source of heat may be operative on the basis of a thermal pad with resistive heaters that is applied to the medium 214. The source of heat may be controlled by the control computer 250; the control computer 250 may provide such control based on the output(s) of the sensor(s) 270.

Figure 3:
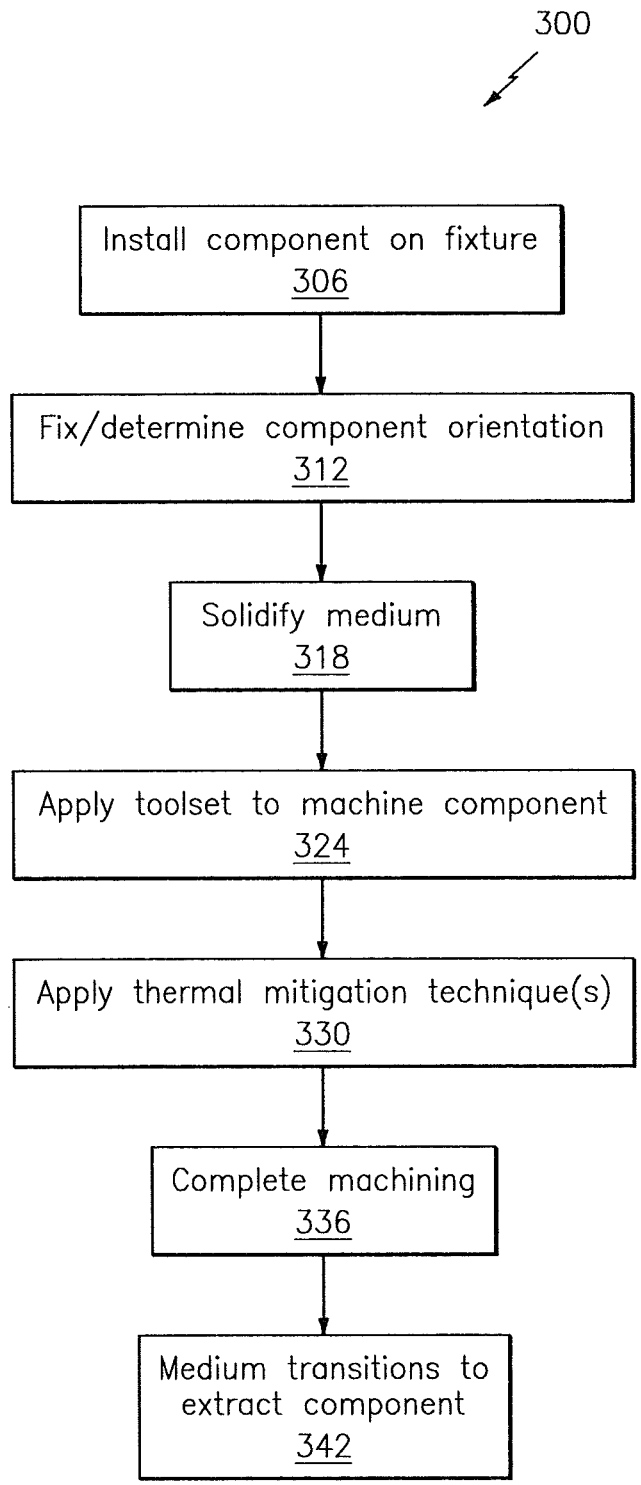
FIG. 3 illustrates a flowchart of an exemplary method in accordance with aspects of this disclosure.

Referring now to FIG. 3, a flowchart of an exemplary method 300 is shown. The method 300 may be used to machine a component (e.g., the blade 202) using a toolset (e.g., toolset 230) via a fixture.

In block 306, the component may be installed on the fixture. As part of the installation, a medium (e.g., medium 214) of the fixture may be maintained in a liquid or semi-liquid state.

In block 312, the orientation of the component may be fixed (e.g., by the pins 220) and/or determined (e.g., via the scanning device 240 and the control computer 250).

In block 318, the medium may solidify to encase a portion of the component (e.g., the airfoil 206). As part of block 318, one or more cooling sources (e.g., source 260) or associated coolant loops may be enabled/activated to facilitate the solidification of the medium.

In block 324, a toolset (e.g., toolset 230) may be applied to at least a portion of the component (e.g., portion 210) to machine the component. To the extent that the orientation of the component in the fixture is variable, the operation of the toolset may be adapted based on the orientation determined as part of block 312.

In block 330, one or more thermal mitigation techniques may be applied. For example, a heat sink (e.g., heat sink 280) may be installed on the component (e.g., the portion 210) and/or a cooling source or associated coolant loop may be enabled/activated.

In block 336, the machining may be completed. As part of block 336, any thermal mitigation techniques that may have been applied (e.g., as part of block 330) may be removed.

In block 342, the medium may be allowed to transition from a solid to a liquid or semi-liquid state in order to allow the component to be extracted from the fixture. One or more sources of heat may be applied to the medium as part of block 342 to accelerate the extraction of the component.

The blocks/operations associated with the method 300 are illustrative. In some embodiments, the blocks may execute in an order or sequence that is different from what is shown in FIG. 3. In some embodiments, one or more of the blocks (or a portion thereof) may be optional.

Figure 4:
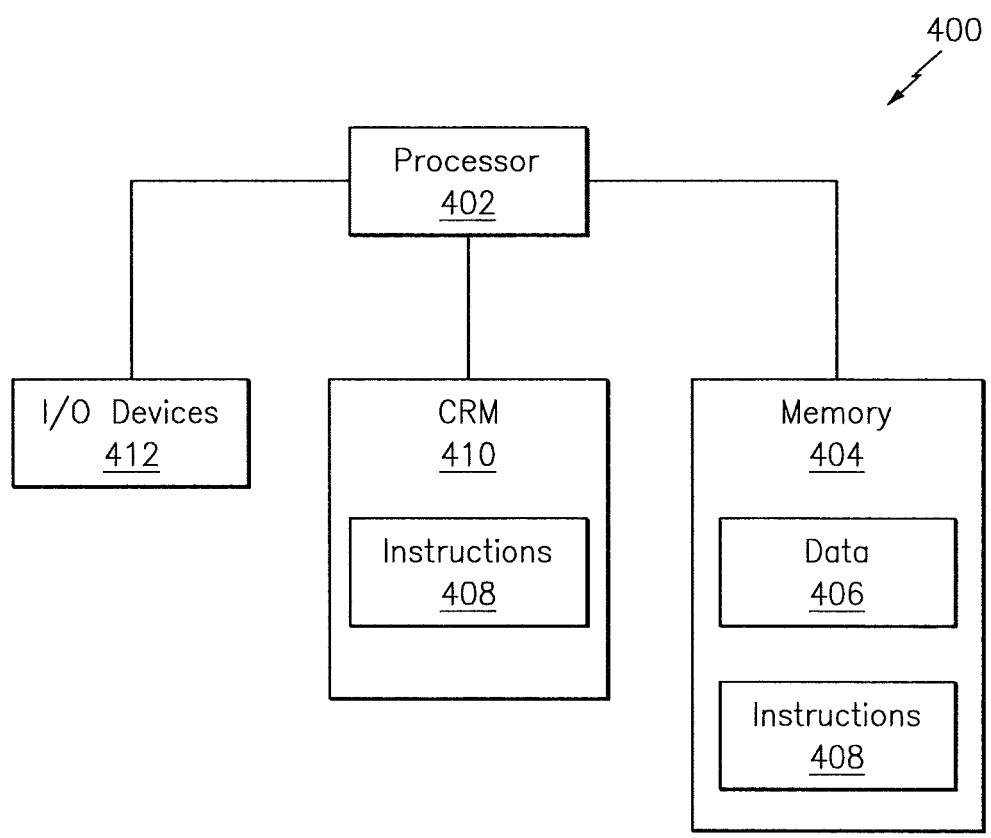
FIG. 4 illustrates a computing system in accordance with aspects of this disclosure.

Referring now to FIG. 4, an illustrative system 400 is shown. The system 400 may be associated with one or more computers and/or one or more controllers (e.g., the control computer 250 of FIG. 2).

The system 400 includes one or more processors (generally shown by a processor 402) and a memory 404. The memory 404 may store data 406 and/or instructions 408. The system 400 may include a computer-readable medium (CRM) 410 that may store some or all of the instructions 408. The CRM 410 may include a transitory and/or a non-transitory computer-readable medium.

The instructions 408, when executed by the processor 402, may cause the system 400 (or one or more portions thereof) to perform one or more methodological acts or processes, such as those described herein.

The data 406 may include data obtained from one or more entities (e.g., the scanning device 240, the sensor 270). The data 406 may include results of processing the obtained data. For example, the data 406 may include a specification of an orientation of a component (e.g., blade 202 of FIG. 2) within a fixture, where the specified orientation may map to parameters that may be used to control a machining operation or a toolset (e.g., toolset 230).

In some embodiments, the data 406 may be associated with one or more programs, such as a modeling or simulation program. For example, the data may be native to or supported by one or more computed aided design or computer aided drawing programs, either one or both of which may be referred to as CAD programs. The data 406 may be used in connection with aligning a component and tooling.

The system 400 may include one or more input/output (I/O) devices 412 that may be used to provide an interface between the system 400 and one or more additional systems or components. The I/O devices 412 may include one or more of a graphical user interface (GUI), a display screen, a touchscreen, a keyboard, a mouse, a joystick, a pushbutton, a microphone, a speaker, a transceiver, a sensor, etc.

Technical effects and benefits of this disclosure include machining operations facilitated by a fixture that is easier and cheaper to operate while also being more environmentally friendly/accommodating. Cycle times for machining components are reduced while providing a constant clamping load to resist vibration during machining. The use of a low melting-point medium reduces energy costs, lessens operator/technician exposure to elevated temperatures, and opens up additional, lower melting-points that may be used with the components being machined. To the extent that water is used as the fixture medium, there is no appreciable chemical interaction between the medium and the component being machined and any residual water that may be on the component following the extraction of the component from the fixture will evaporate, thereby reducing any cleaning operations. Use of water as a medium also enables incorporation of other components (composite, injection molded thermoplastic, etc.) as part of a fixture, where those other components might not be thermally compatible with conventional low-melt alloy processes.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A fixture for machining a component, comprising:
   a medium configured to encase a first portion of the component when the medium is in a solidified state;
   a toolset configured to be applied to a second portion of the component that is outside of the solidified medium;
   a control computer;
   none or more temperature sensors in contact with the first portion of the component and encased in the medium; and
   a thermal pad with resistive heaters that are controlled by the control computer based on an output of the one or more temperature sensors that cause the medium to transition from the solidified state to at least one of a liquid state or a semi-liquid state,
   wherein the medium has a melting-point temperature that is less than 500 degrees Fahrenheit, and
   wherein the medium includes water.

2. The fixture of claim 1, further comprising:
   gage pins in contact with the component and encased in the medium, the gage pins configured to provide a predetermined orientation of the component with respect to the fixture.

3. The fixture of claim 1, further comprising:
   a scanning device configured to scan the component and generate data that pertains to an orientation of the component in the fixture; wherein the control computer is configured to process the data to determine the orientation and control the toolset in accordance with the determined orientation.

4. The fixture of claim 3, wherein the scanning device is operative on a basis of white light or the use of a laser.

5. The fixture of claim 1, further comprising:
   a cooling source configured to cool the medium when the toolset is applied to the second portion of the component.

6. The fixture of claim 5, wherein the cooling source includes a source of liquid nitrogen.

7. The fixture of claim 5,
   wherein the cooling source is controlled by the control computer based on the output of the one or more temperature sensors.

8. The fixture of claim 1, further comprising:
   a heat sink coupled to the second portion.

* * * * *